April 25, 1961  H. JENSEN  2,981,558
ALL METAL SHAFT SEAL
Filed Sept. 25, 1958
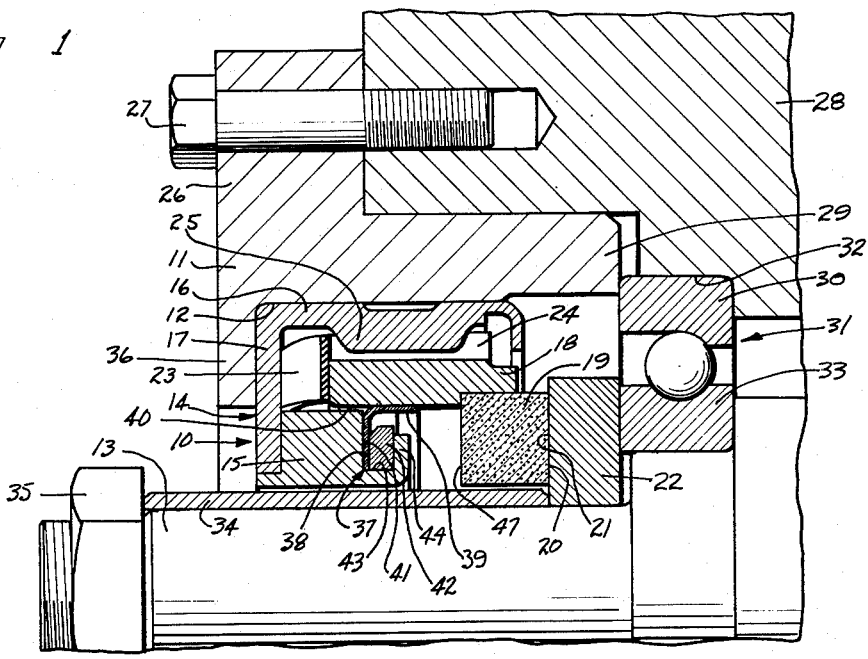
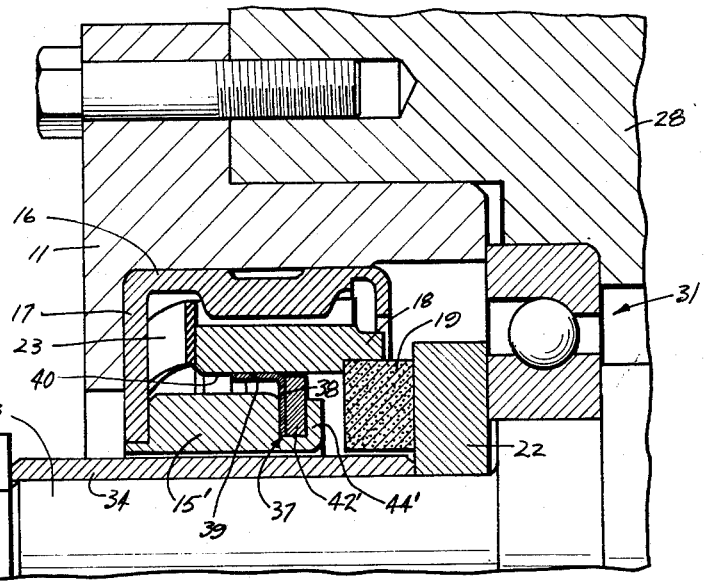
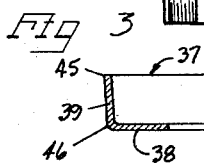
Inventor
HANS JENSEN
by Hill, Sherman, Meroni, Gross & Simpson Attys.

2,981,558
ALL METAL SHAFT SEAL

Hans Jensen, Wheeling, Ill., assignor to Gits Bros. Mfg. Co., Chicago, Ill., a corporation of Illinois Filed Sept. 25, 1958, Ser. No. 763,313

3 Claims. (Cl. 286—11.14)

This invention relates to a shaft seal and more particularly to a seal for use between a wall element having an opening therethrough and a shaft element extending through the opening, to prevent flow from a high pressure fluid zone on one side of the wall element to a lower pressure zone on the other side thereof, in which an annular support ring is carried by one of the elements with a sealing ring carried by the support ring and having a sealing face engage with a sealing face carried by the other of the elements.

In such seals, it is necessary to provide for relative axial movement of the support ring relative to the element which carries the same, while at the same time providing a seal therebetween. It has heretofore been the practice to construct such seals from elastomeric materials such as synthetic rubber, Teflon, silicone materials, and the like. It is found however that various types of equipment, such as pumps, gear boxes, turbines and compressors are now being operated at such extremely high temperatures as well as low temperatures and in such a variety of liquid and gases, that such materials are not capable of operating under such conditions for a satisfactory length of time because the operating temperatures and liquids and gases result in rapid deterioration of the elastomeric material or change its physical properties to cause it to malfunction.

This invention was evolved with the object of providing an improved seal of the type described above, using an all metal connection between the support ring and the element carrying the same, to maintain a proper seal while at the same time allowing relative axial movement.

According to this invention, a seal is provided between the support ring and the element from which it is supported, in the form of a ferrule of thin resilient metal having an annular planar portion transverse to the axis of the support ring and a cylindrical portion projecting integrally from one edge of the planar portion. The planar portion is secured to the element which carries the support ring, and one surface of the cylindrical portion is engaged with a cylindrical surface on the support ring. With this comparatively simple construction, it is found to be possible to maintain a proper seal while allowing relative axial movement of the support ring. Because of the use of metal elements, the seal is extremely durable and will withstand extremely high temperatures and temperature changes, as well as a great variety of liquids and gases.

According to an important feature of the invention, the cylindrical portion of the ferrule is maintained in firm engagement with the cylindrical surface portion of the support ring by the inherent resilience of the ferrule. In accordance with this feature, the cylindrical portion of the ferrule has a slightly frusto-conical shape when the ferrule is in unstressed condition, the diameter of the terminal edge of the cylindrical portion being at least slightly different from the diameter of the portion thereof which is secured to the planar portion, in a manner such that the maximum pressure engagement between the cylindrical surfaces of the ferrule and support ring is obtained at a point adjacent the terminal edge of the cylindrical portion of the ferrule.

According to another feature of the invention, the support ring is displaceable within limits in directions transverse to the axis thereof and is urged by the ferrule to a position intermediate the limits. Thus the ferrule performs a centering function, and also this feature insures uniform engagement of the cylindrical surfaces.

According to a further feature of the invention, the cylindrical portion of the ferrule extends in a direction such that the cylindrical surface thereof which is not engaged with the cylindrical surface of the support ring, is exposed to fluid from the zone of higher pressure, so as to increase the pressure between the cylindrical sealing surfaces.

In accordance with another feature of the invention, a cartridge construction is employed, with the support ring being disposed between coaxial inner and outer walls of a support member, one of the walls being supported either from the wall element or the shaft element, and the ferrule being secured to the other of the cylindrical walls. Preferably, the outer cylindrical wall is secured in the opening of the wall element, and the ferrule is carried by the inner cylindrical wall, the cylindrical portion of the ferrule being engaged with an internal cylindrical portion of the support ring.

This invention contemplates other and more specific objects, features and advantages which will become more fully apparent from the following detailed description taken in conjunction with the accompanying drawings which illustrate preferred embodiments and in which:

Figure 1 is a partial sectional view through one preferred form of shaft seal constructed according to the principles of this invention;

Figure 2 is a partial sectional view through another preferred form of shaft seal constructed according to the principles of this invention; and Figure 3 is a view showing a sealing element in unstressed condition, prior to assembly in the seal of Figure 1 or the seal of Figure 2.

Reference numeral 10 generally designates a seal assembly constructed according to the principles of this invention, and disposed between a wall element 11 having an opening 12 therethrough and a shaft element 13 extending through opening 12, the seal assembly 10 being effective to prevent flow from a high pressure zone on one side of the wall element 11, the left-hand side as viewed in Figure 1, to a lower pressure zone on the other side thereof.

The assembly 10 comprises a support member 14 having inner and outer coaxial cylindrical walls 15 and 16 with an annular radially extending wall 17 between adjacent end of walls 15 and 16, the outer wall 16 being fitted within the opening 12.

A carried or support ring 18 is disposed within the support member 14, between the inner and outer walls 15 and 16, and carries a sealing ring 19 having a sealing face 20 arranged to engage a sealing face 21 of a ring 22 carried by the shaft 13. The sealing ring 19 may preferably be formed of carbon or a similar sealing and lubricating material.

The carrier or support ring 18 together with the sealing ring 19 are axially shiftable relative to the wall element 11, to accommodate axial shifting movement of a shaft 13 or to accommodate wear of the surfaces 20, 21. A compression spring 23, preferably in the form of a wave washer spring, is provided between the radial wall 17 and one end of the support ring 18, to maintain the sealing faces 20, 21 and pressure engagement while accommodating such axial shifting movement. To prevent rotation of the carrier or support ring 18, it is provided with one or more axially extending peripheral slots 24 which receive one or more inward indentations 25 in the outer cylindrical wall 16.

The wall element 11 may include a flange portion 26 secured by one or more bolts 27 to a wall element 28 and may have a portion 29 fitted within an opening in the wall element 28, with the portion 29 serving to hold an outer race 30 of a ball bearing assembly 31 within a recess 32 of the element 28. The illustrated bearing 31 has an inner race 33 held on the shaft 13 by the ring 22, the ring 22 being held in position by a sleeve 34 engaged by a nut 35 threaded on the end of the shaft 13. The wall element 11 has an inwardly extending portion 36 abutting the radial wall 17 to hold the assembly 19 within the wall element 11.

It is necessary to provide a seal between the carrier or support member 14 while accommodating relative axial shifting movement thereof. According to this invention, a seal is provided comprising a ferrule 37 formed of thin resilient metal and including an annular planar portion 38 and a cylindrical portion 39 projecting axially from the outer edge of the planar portion 38. The outer surface of the generally cylindrical portion 39 is in sealing engagement with an internal cylindrical surface 40 of the carrier or support ring 18.

The planar portion 38 is supported from the inner cylindrical wall 15 of the support member 14. In particular, the wall 15 is provided with a radially extending surface 41 facing in the same direction as the direction in which the cylindrical portion 39 extends. The planar portion 38 of the ferrule may be fixed to the surface 41 by welding, brazing or soldering. In the alternative, or in addition, a clamping arrangement may be used including a washer 42 engaging a surface of the planar portion 38 which faces in the same direction as the direction in which the cylindrical portion 39 projects. The washer 42 surrounds a cylindrical surface 43 of the wall 15 and an integral radial flange 44 is provided on the wall 15 for holding the washer 42 against the planar portion 38, to thereby hold the planar portion 38 against the surface 41.

In assembly, the flange 44 is initially in a position in which it does not project outwardly beyond the surface 43, and the ferrule 37 and washer 42 are installed on the wall 15. Thereafter, the flange 44 is bent radially outwardly to the illustrated position. It will be noted that the inner surface of the flange 44, together with the surfaces 41 and 43 define an annular groove receiving planar portion 38 and washer 42.

Figure 3 shows the ferrule 37 in unstressed condition prior to installation in the assembly 10. It will be noted that in the unstressed condition, the generally cylindrical portion 39 has a slightly frusto-conical shape, to extend annularly outwardly from the planar portion 38 to a terminal edge indicated by reference numeral 45. The terminal edge 45 has a diameter larger than the diameter at a point 46 at which portions 38 and 39 adjoin, and the diameter at the terminal edge 45 should be substantially larger than the diameter of the internal cylindrical surface 40 of the support ring 18. With this feature, the inherent resilience of the ferrule 37 urges the outer surface of the portion 39 into engagement with the surface 40. To obtain extended surface engagement, the diameter at the point 46 should be approximately equal to the diameter of the surface 40.

It will be noted that in Figure 1, the portion 39 of the ferrule 37 projects to the right, so that the inner surface thereof is exposed to the fluid from the zone at the left-hand side of the wall element 11, which is at a higher pressure than the fluid in the zone at the right-hand side of the wall element 11. With this feature, the fluid pressure assists in effecting a tight sealing contact between the outer surface of the portion 39 and the surface 40.

It is also noted that the support ring 18 is free to move in directions transverse to the axis thereof, within limits, the outer surface of the wall 15 being spaced from the surface 40, the outer surface of the ring 18 being spaced inwardly from the inner surface of the outer wall 16, and the inner edge of the slot 24 being spaced inwardly from the inner edge of projection or indentation 25. The ferrule urges the support ring 18 to a centered position intermediate such limits, to thus provide a floating action. Also, this relationship insures uniform engagement of the cylindrical portion 39 with the surface 40 through 360°.

It should further be noted that the radial surface 41 of the wall 15 should provide sufficient backing for the planar portion 38, to prevent distortion of the ferrule. As illustrated, the surface 41 should have a radial extent equal to and coextensive with the radial extent of the portion 38. The radial extent of the washer 42 need not be as great as the radial extent of the planar portion 38, but is preferably at least one-half of the radial extent of the portion 38, to insure that the portion 38 will be firmly held.

It is important that there be sufficient freedom of sliding motion between ferrule 37 and the carrier or support ring 18. For example, if the position of the shaft 13 should move to the right, the carrier or support ring 18 must move to the right to maintain sealing engagement between faces 20, 21. This condition is obtained when the algebraic sum of the force exerted by the spring 23 and any net force exerted by fluid pressure on surfaces of the support ring 18 and sealing ring 19 (such as exerted on surface 47 of ring 19, for example) is substantially greater than the product of two values, one value being the coefficient of friction between surface 40 and the external surface of portion 39, and the other value being the sum of the force exerted on the portion 39 by the inherent resilience of the ferrule and a force substantially equal to the product of the pressure exerted upon an area of the internal surface of portion 39. Preferably, very smooth surfaces are employed.

Figure 2 illustrates a modified arrangement, in which the position of the ferrule 37 is reversed so that the inside surface of the generally cylindrical portion 39 thereof is exposed to fluid from the zone at the right-hand side of the wall element 11, the zone at the right-hand side being in this case under high pressure, with the zone of the left-hand side being under lower pressure. In this modification, all of the elements are the same as in the assembly of Figure 1, except for the use of a modified washer 42' and a modified inner wall 15' having a flange 44'. The washer 42' has a radial extent substantially equal to and coextensive with the planar portion of the ferrule 37, to provide proper backing therefor. The modified inner wall 15' extends further to the right than the wall 15 in Figure 1, in a manner such that the cylindrical portion 39 of the ferrule engages a central portion of the internal cylindrical surface 40 of the carrier or support ring 18. Also, the external diameter of the inner wall 15' is somewhat less than that of the wall 15 of Figure 1, to provide clearance for the cylindrical portion 39 of the ferrule.

It will be understood that modifications and variations may be effected without departing from the spirit and scope of the novel concepts of this invention.

I claim as my invention:

1. A secondary seal for use in a shaft seal having a support member and a relatively axially movable member with a sealing face for engagement with a sealing face on a shaft, the secondary seal comprising a continuous annular ferrule of thin resilient metal having an annular planar portion for positioning transverse to the axis of a shaft element and having a resilient generally cylindrical portion projecting axially from one edge of said planar portion, a support member, means for rigidly securing said planar portion to said support member, and a relatively axially movable outer member having an inner cylindrical surface in close sliding engagement with the outer surface of said cylindrical portion of the ferrule and supported radially thereby and said ferrule and said movable outer member maintained in firm sealing engagement by the inherent resilience of said ferrule.

2. A secondary seal for use in a shaft seal having a support member and a relatively axially movable member with a sealing face for engagement with a sealing face on a shaft, the secondary seal comprising a continuous annular ferrule of thin resilient metal having an annular planar portion for positioning transverse to the axis of a shaft element and having a resilient generally cylindrical portion projecting axially from one edge of said planar portion, a support member having a cylindrical wall with a radial surface engaged by one face of said planar portion, a washer engaging the other face of said planar portion, an integral flange on said support member crimped into engagement with said washer to firmly hold said planar portion between said washer and said radial surface of the cylindrical wall, and a relatively axially movable outer member having an inner cylindrical surface in close sliding engagement with the outer surface of said cylindrical portion of the ferrule and supported radially thereby and said ferrule and said movable outer member maintained in firm sealing engagement by the inherent resilience of said ferrule.

3. A secondary seal for use in a shaft seal having a support member and a relatively axially movable member with a sealing face for engagement with a sealing face on a shaft, the secondary seal comprising a continuous annular ferrule of thin resilient metal having an annular planar portion for positioning transverse to the axis of a shaft element and having a resilient generally cylindrical portion projecting axially from one edge of said planar portion, a support member having a cylindrical wall with the planar portion of the ferrule mounted on said wall, means for securing said planar portion to said wall, and a relatively axially movable outer member having an inner cylindrical surface in close sliding engagement with the outer surface of said cylindrical portion of the ferrule and supported radially thereby and said ferrule and said movable outer member maintained in firm sealing engagement by the inherent resilience of said ferrule.

References Cited in the file of this patent

UNITED STATES PATENTS

| | | |
|---|---|---|
| 224,695 | Johnson | Feb. 7, 1880 |
| 671,551 | Halsey | Apr. 9, 1901 |
| 1,378,109 | Hecht et al. | May 17, 1921 |
| 2,226,273 | Westerfeld | Dec. 24, 1940 |
| 2,316,059 | Fretter | Apr. 6, 1943 |

FOREIGN PATENTS

| | | |
|---|---|---|
| 205,228 | Australia | Jan. 3, 1957 |
| 205,749 | Australia | Feb. 1, 1957 |
| 1,122,075 | France | Aug. 31, 1956 |